United States Patent [19]
Kyrtsos

[11] Patent Number: 5,105,896
[45] Date of Patent: Apr. 21, 1992

[54] DYNAMIC PAYLOAD MONITOR
[75] Inventor: Christos T. Kyrtsos, Peoria, Ill.
[73] Assignee: Caterpillar Inc., Peoria, Ill.
[21] Appl. No.: 665,195
[22] Filed: Mar. 5, 1991
[51] Int. Cl.$^5$ ............... G01G 19/08; G01G 19/10; G01G 19/40
[52] U.S. Cl. .................. 177/139; 177/141; 177/25.14
[58] Field of Search ............ 177/139, 141, 146, 147, 177/25.14

[56] References Cited

U.S. PATENT DOCUMENTS

| | | | |
|---|---|---|---|
| 4,055,255 | 10/1977 | Vasquez | 214/2 |
| 4,230,196 | 10/1980 | Snead | 177/141 |
| 4,390,075 | 6/1983 | Snead | 177/210 FP |
| 4,835,719 | 5/1989 | Sorrells | 364/567 |
| 4,919,222 | 4/1990 | Kyrtsos et al. | 177/139 |
| 4,995,468 | 2/1991 | Fukuda | 177/139 |
| 5,038,876 | 8/1991 | Smith | 177/139 |

Primary Examiner—George H. Miller, Jr.
Attorney, Agent, or Firm—James R. Yee

[57] ABSTRACT

A dynamic payload monitor measures and displays payload weight for a loader vehicle by sensing the hydraulic pressure of a lift arm cylinder. The payload weight is computed by curve fitting the second cylinder pressure to a second order polynomial, calculating a pressure differential, and then performing interpolation or extrapolation with a pair of pressure versus position or time reference parabolas obtained during calibration. The weight computation algorithms used in the dynamic payload monitor are applicable to a number of work vehicles having at least one work implement linkage and at least one hydraulic cylinder for modifying the linkage geometry.

10 Claims, 6 Drawing Sheets

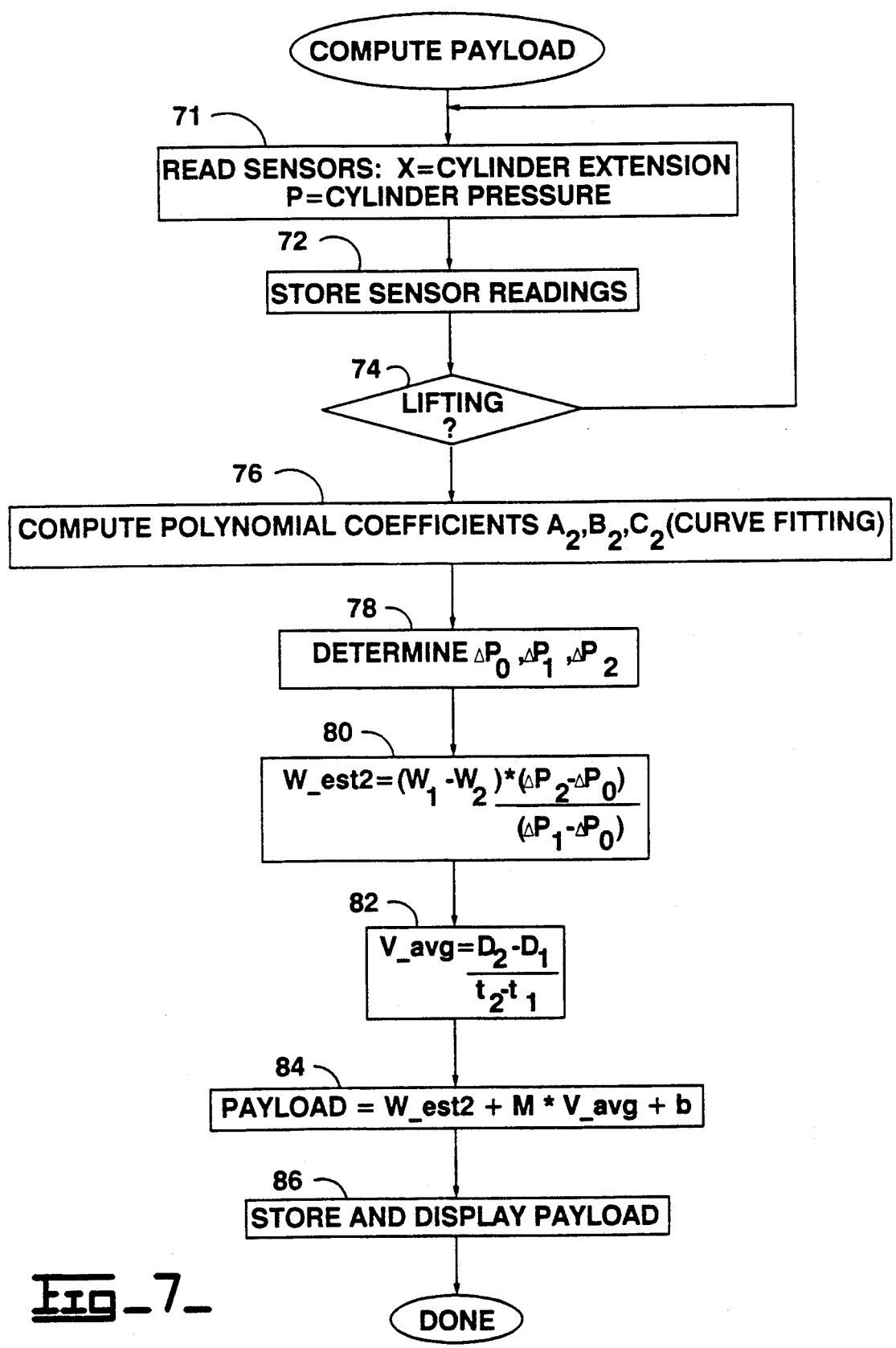
Fig-7-

5,105,896

DYNAMIC PAYLOAD MONITOR

DESCRIPTION

1. Technical Field

This invention relates generally to vehicles for transferring bulk material and, more particularly, to an apparatus and method for weighing and indicating the weight of the bulk material being transferred.

2. Background Art

Vehicles such as loaders are used generally to transfer bulk material from a stock pile onto transport vehicles such as trucks or railroad cars. In such vehicle loading applications, it is desirable that the transport vehicles are loaded to, but not over, their maximum rated legal capacity. Underloading causes inefficiency in the material hauling cycle and underutilization of the transport vehicles. Overloading causes additional maintenance cost and extra wear on the truck tires and suspension system. Furthermore, the overloaded material may need to be unloaded to decrease load weight, causing additional expense.

Payload measurement is also desirable as a measure of the material hauling operation productivity. The ability to accumulate the weight of the material loaded during a single shift, during a twenty-four hour period, or during any other time period is valuable to an operations manager.

A number of payload measuring devices have been developed. One such device is described in U.S. Pat. No. 4,230,196, issued to Snead on Oct. 28, 1980. Snead discloses a load weighing and accumulating system for a loader. Snead's device includes a pressure sensor for detecting the hydraulic pressure in the lift cylinder of the loader, and a lift arm alignment member which provides a visual aid to the operator to facilitate positioning the lift arm at a predetermined weighing location. To measure the load in the loader bucket, the operator positions the lift arm by visually aligning the alignment members on the lift arm and the vehicle frame. Following a time delay, the load is weighed.

This device has several disadvantages. The amount of data sampled in one-half second is small and results in inaccurate measurements. This is especially significant when the vehicle is operating over rough terrain. The lift cylinder pressure rises when the vehicle hits a bump, and drops when the vehicle experiences "free fall" as it clears the bump, causing pressure deviations. The same sharp pressure deviations occur when the vehicle encounters a surface depression, except the pressure first decreases then increases.

In a typical loader operation environment, the ground surface is uneven. The Snead device requires that the vehicle dynamics be at a steady state when the data sampling is taking place, which is not possible when the vehicle is traveling. Weighing accuracy is severely compromised because of the small data sampling time window. The Snead device also requires that the operator maintain the position of the lift arm while measurement is taking place. This requirement has two implications. Because the cylinder pressure can vary over a large range depending on the lift arm position, if the operator fails to align the lift arm the resultant payload measurement may be grossly erroneous. In addition, requiring the operator to stop the lift arm and position it with the alignment members interrupts the operator's pace and disrupts the loading process.

Another device, disclosed in U.S. Pat. No. 4,055,255, issued to Vasquez on Oct. 25, 1977, describes an apparatus and method for carrying and delivering payload of a predetermined weight. The Vasquez device senses hydraulic pressure in the cylinder supporting the bucket. Because of the peculiar configuration of the vehicle implement linkage, the lift cylinder of the bucket is generally upright except when the bucket is lowered to obtain a load. Therefore, the Vasquez device is a special application payload weighing device not suitable for usage on loaders having different and more conventional linkage configurations.

Also, wear and deterioration in the lift cylinders modifies the hydraulic system significantly. Therefore, the system will produce erroneous payload readings unless recalibrated. Furthermore, the temperature of the seals within the cylinders will increase during long periods of use. This has the effect of increasing the friction between the seals and the cylinder, causing unpredictable results. It is therefore desirable to have a payload monitor system isolated from the effects of increased friction and cylinder wear.

The present invention is directed to overcoming one or more of the problems set forth above.

DISCLOSURE OF THE INVENTION

In one aspect of the present invention, an apparatus for dynamically measuring payload weight supported by an implement linkage of a work vehicle is provided. A hydraulic cylinder, connected between the vehicle and the implement linkage, actuates the implement linkage. A pressure sensor detects the pressure of the hydraulic fluid within the hydraulic cylinder and responsively produces a first signal. A controller receives the first signal, responsively calculates a pressure differential, and determines the payload weight as a function of the pressure differential.

The invention also includes other features and advantages which will become more apparent from a more detailed study of the drawings and the specification.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
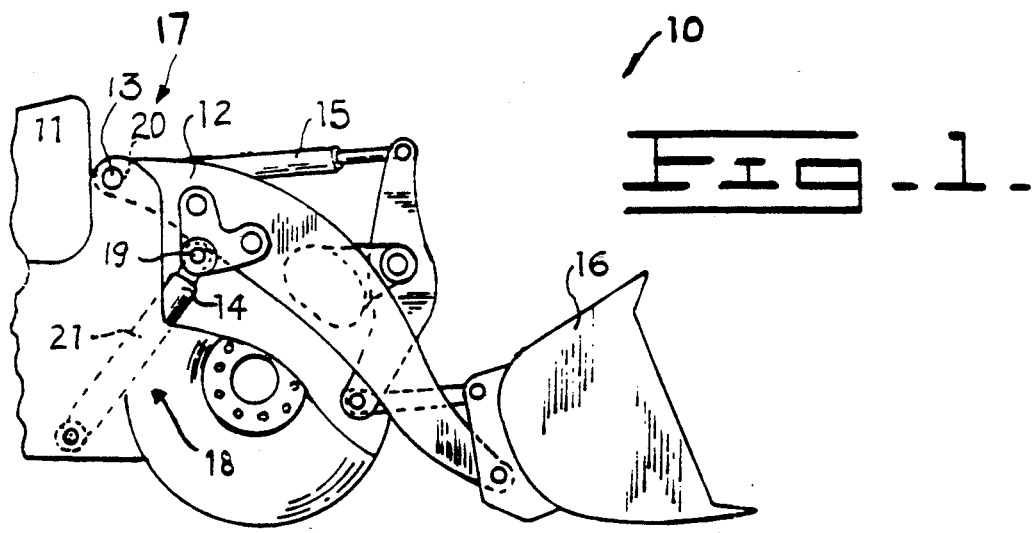
FIG. 1 is a side view of the forward portion of a loader vehicle.

In FIG. 1 a payload monitoring system is generally represented by the element number 10. Although FIG. 1 shows a forward portion of a wheel type loader vehicle 11 having a payload carrier in the form of a bucket 16, the present invention is equally applicable to vehicles such as track type loaders, and other vehicles having similar loading implements. The bucket 16 is connected to an implement linkage or lift arm assembly 12, which is pivotally actuated by two hydraulic lift cylinders 14 (only one of which is shown) about a pair of lift arm pivot pins 13 (only one shown) attached to the vehicle frame. A pair of lift arm load bearing pivot pins 19 (only one shown) are attached to the lift arm assembly 12 and the lift cylinders 14. The bucket 16 can also be tilted by a bucket tilt cylinder 15.

Position sensing means 17 detects the relative position of said lift arm assembly 12. In the preferred embodiment, the position sensing means 17 includes a rotary sensor 20 adapted to sense the rotation of one of the lift arm pivot pins 13 from which the geometry of the lift arm assembly 12 or the extension of the lift cylinders 14 can be derived. The same rotary sensor 20 can be alternatively installed on the load bearing pivot pins 19 to provide the same information. Alternately, a linear sensor may be used which delivers information relating directly to the extension of the lift cylinders 14. For example, a radio frequency (RF) linear position sensor as disclosed in U.S. Pat. No. 4,737,705, issued Apr. 12, 1988 to Bitar, et al, may be used.

Pressure sensing means 18 detects the hydraulic pressure in one of the lift cylinders 14. In the preferred embodiment, the pressure sensing means 18 includes a pressure transducer 21. Although there are two lift cylinders 14, the pressure in the cylinders is generally the same for a given payload and given lift arm assembly geometry. Thus, sensing pressure at one of the cylinders 14 is sufficient for the present application.

Figure 2:
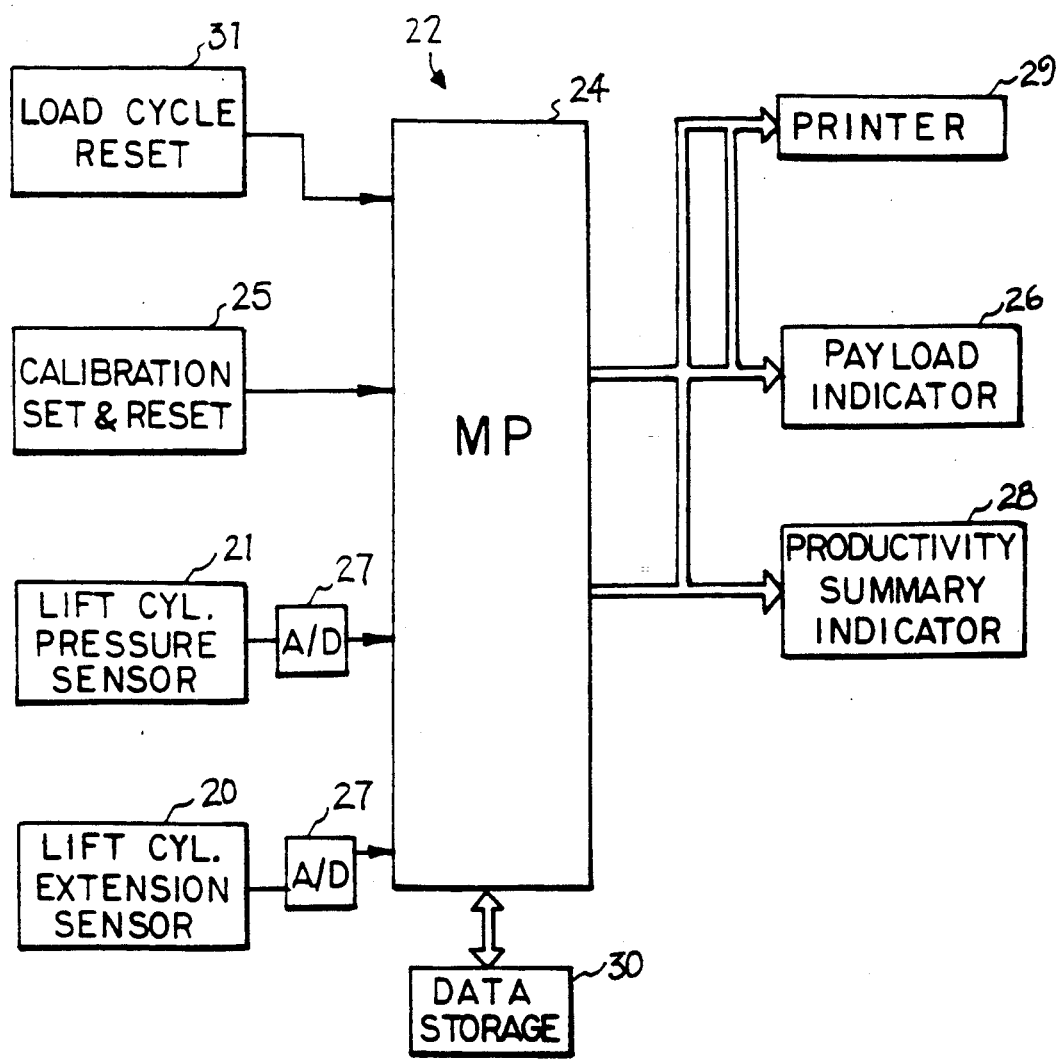
FIG. 2 is a block diagram of an embodiment of the present invention.

Referring to FIG. 2, the cylinder pressure and extension sensor signals are delivered to computing means 22, after being processed by respective analog to digital (A/D) converters 27. In the preferred embodiment, the computing means 22 includes a microprocessor 24. A calibration control unit 25 enables calibration of the payload monitoring system 10. An operator can reset calibration data and enter calibration payload weight values using the calibration control unit 25. A load cycle reset control unit 31 enables the operator to indicate the beginning and end of a load cycle for a specific transporting vehicle or dump site. The calibration control 25 and the load cycle reset control 31 are preferably implemented in combination with payload weight and productivity summary indicators 26, 28, using a liquid crystal display screen (not shown) and an alphanumeric key pad (not shown). The payload weight indicator 26 displays the measured payload weight and any other weight data, such as a productivity summary of the loading operation of the loader vehicle 11. The preferred embodiment includes a printer 29 that produces hard copy reports, and capability to store information in a data storage unit 30 such as nonvolatile memory or a data disk drive.

Figure 3:
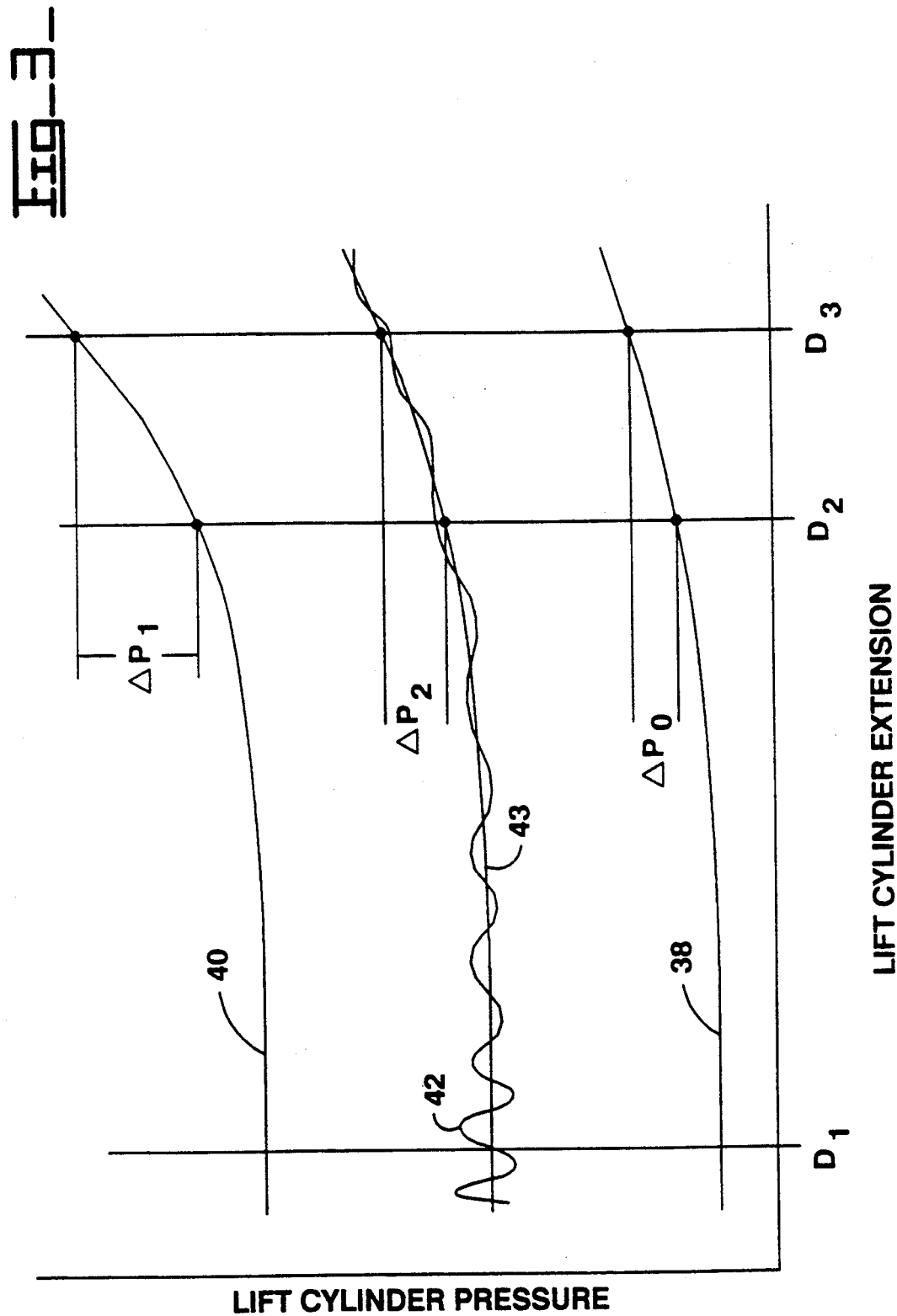
FIG. 3 is a graphical representation of cylinder pressure versus cylinder extension or time.

FIG. 3 graphically illustrates the relationship between cylinder pressure and cylinder extension in an embodiment of the present invention. The pressure and extension data is plotted on a graph having the lift cylinder pressure on the vertical Y-axis and the lift cylinder extension on the horizontal X-axis. A first parabolic curve 38 represents the curve fitted pressure versus extension data for an empty loader bucket 16. A second parabolic curve 40 represents the curve fitted pressure versus extension data for a payload of known weight. This known weight is preferably at or near the rated load capacity of the vehicle 11. The parabolas can be represented mathematically by second order polynomials. The curves 38,40 are sampled and stored as reference weight curves for the payload monitor system during the calibration portion (FIG. 5) of the control algorithm.

In one embodiment, the sampled and stored curves may be compared with a set of "basic" curves which are set at the factory. The basic curves are based on test data and would be standard for a given machine and configuration. If the sampled curves deviate from the basic curves by a predetermined amount, the operator is notified.

In an alternate embodiment for applications in which the lift velocity is constant (or in which it may be assumed constant), cylinder pressure vs. lift time may be used. Lift times are easily obtainable with the use of the microprocessor 24. For the purposes of explanation, lift cylinder extensions are used in the following discussion, however, lift times may be substituted for lift cylinder extension.

As shown in FIG. 3, the lift cylinder pressure increases as the cylinder extension increases, so that the measured weight is dependent on the geometry of the lift arm assembly 12 as the bucket 16 is being raised from the ground to dump height. Because the loader is typically digging at the beginning of a work cycle and dumping at the end of the cycle, cylinder pressure varies drastically at each end of the cycle and the dynamics of the system are unstable. Therefore, weight measurement is confined to a time period when the lift cylinder extension displacement is between $D_1$ and $D_3$, where $D_3 > D_1$. This ensures a set of usable sample data that accurately represents payload weight during a relatively stable portion of the work cycle. Trace 42 represents the measured load cylinder pressure versus cylinder extension. The random surges in the trace 42 denote the pressure variations in the lift cylinder during vehicle travel and directional changes.

Curve 43, which is shown superimposed over trace 42, has been curve fitted and averaged to remove the random pressure surges. The smoothed parabola 43 is an accurate representation of the pressure versus extension of the weight being measured. Experimentation has shown that lift cylinder pressure varies linearly with the weight of the payload at a particular cylinder extension for a specific lift velocity. Therefore, the payload weight can be calculated by interpolation if the curve 43 falls between the reference curves 38,40, and by extrapolation if the curve 43 is outside of the reference curves 38,40.

Figure 4:
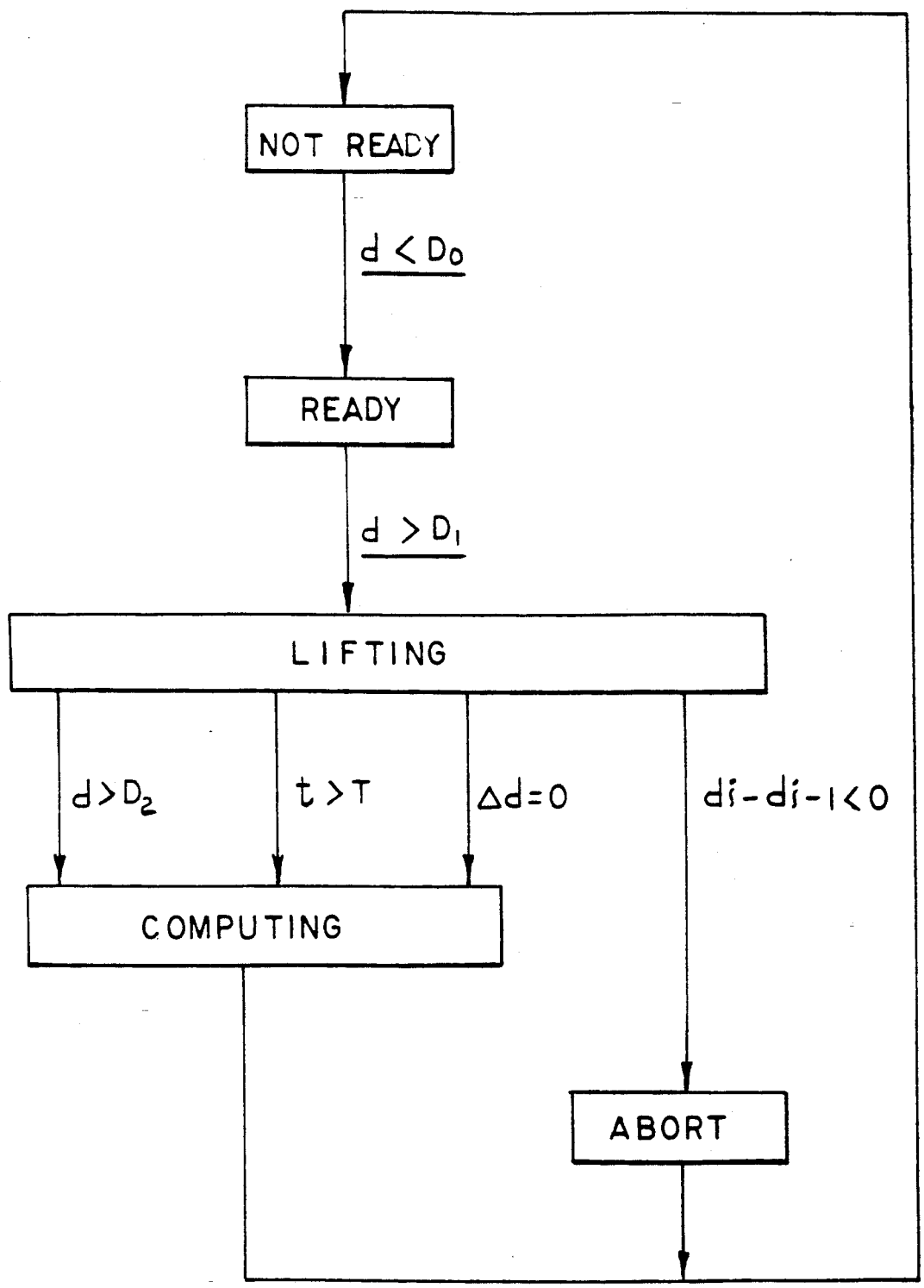
FIG. 4 is a state transition diagram of the system.

Referring to FIG. 4, a state transition diagram of the present invention is shown. The present embodiment of the payload monitor 10 makes a transition from state NOT READY to READY when the lift cylinder extension is less than a first predetermined set point $D_0$ (d<$D_0$) When the displacement (d) is less than $D_0$, the payload carrier or bucket 16 is most probably digging or crowding a pile. When the displacement is greater than another predetermined displacement set point $D_1$ (d>$D_1$), the vehicle 11 is lifting the payload carrier 16, and the present state is LIFTING. During LIFTING, cylinder pressure and position data are sampled.

Three conditions can cause state transition from LIFTING to COMPUTING. State transition occurs when cylinder extension exceeds another setpoint $D_2$ (d>$D_2$), signifying that the payload carrier has been raised and is approaching dump height. If, after T seconds, displacement $D_2$ still has not been reached (t>T), the system makes the same transition from LIFTING to COMPUTING. The third condition for the transition is when the cylinder displacement remains unchanged ($\Delta d=0$). This condition denotes most load-and-carry operations where the loader vehicle 11 performs as the transport vehicle and travels to the destination with the bucket 16 held at a constant level. The payload weighing algorithm is aborted (ABORT) when the payload carrier 16 is determined to have been lowered ($d_i - d_{i-1} < 0$). The values $D_0$, $D_1$, $D_2$, and T are determined according to the specific vehicle, and can be obtained by measurement and experimentation.

Figure 5:
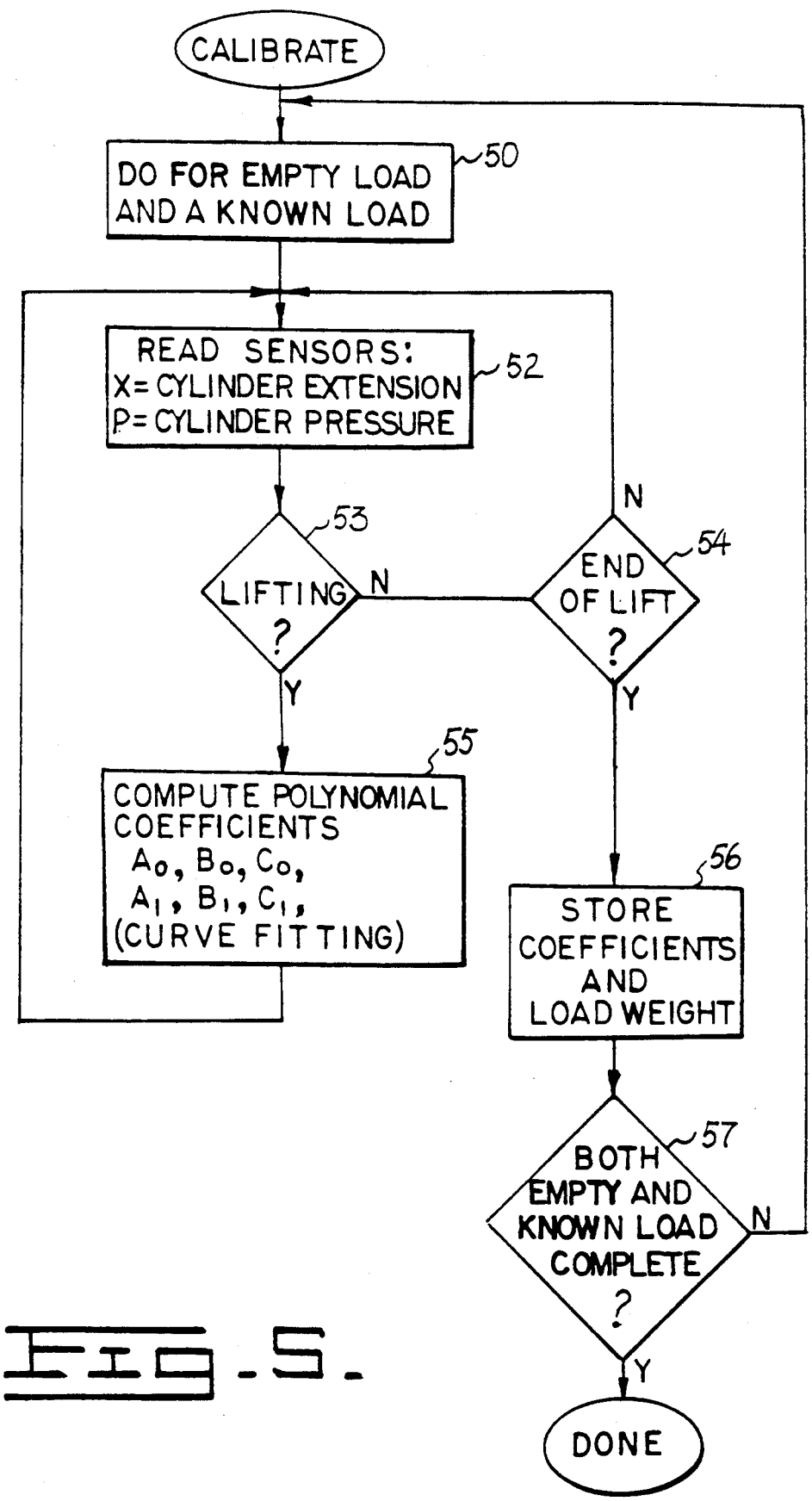
FIG. 5 is a flow chart of the calibration portion of an algorithm used in the embodiment of FIG. 2; and, FIG. 6 is a flow chart of the computation portion of an algorithm used in the embodiment of FIG. 2.

Keeping the state transition diagram of FIG. 4 in mind, reference is now made to the calibration flowchart of FIG. 5. Calibration is done sequentially with both an empty and a known load, as shown in block 50. The order in which calibration is performed is unimportant, but cylinder pressure and position data for both reference weight values must be sampled.

In block 52, the cylinder pressure and position sensors 20,21 are read. The LIFTING state flag is checked at block 53, and if the payload is being lifted, the polynomial coefficients, $A_0$, $B_0$, $C_0$, $A_1$, $B_1$, $C_1$, for that specific pressure and position sample are computed at block 55. This is the step where the sampled sensor data points are curve fitted to a second order polynomial.

If the payload is not being lifted (LIFTING flag is false), then block 54 is checked to see if END OF LIFT has occurred. The END OF LIFT flag is true if any of the conditions for state transition from LIFTING to COMPUTING is true in FIG. 4. If the END OF LIFT conditions are not met, the algorithm returns to block 52 to continue to read the sensor inputs. Otherwise, in block 56, the coefficients are stored along with the payload weight, which is either zero for an empty bucket or nonzero for a known weight. Finally, a check is made at block 57 to make certain that both empty and known payload weights are sampled before completing the calibration algorithm.

Figure 6:
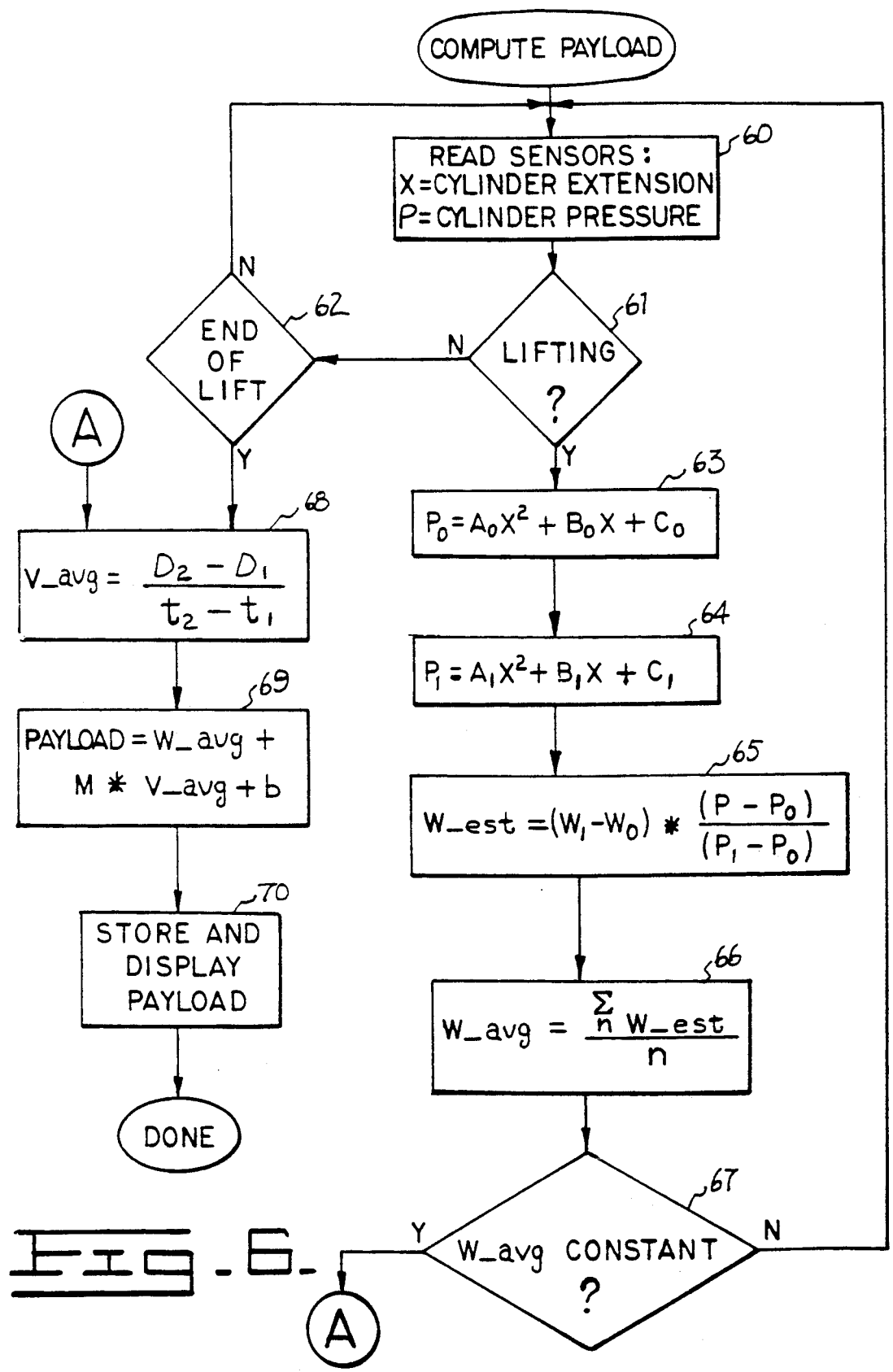

Referring next to FIGS. 6 and 7, the payload is calculated when the state of the system is LIFTING (refer back to FIG. 4). As shown in FIG. 6, a first estimate of the payload, W_est, may be calculated. The work cylinder pressure and position sensors 20,21 are read in block 60. The LIFTING state flag is checked at this point in block 61. If the vehicle 11 is still lifting the payload carrier 16, the cylinder pressure $P_0$ for the empty payload carrier (zero payload weight) at that cylinder extension X is calculated in the block 63 by using coefficient values computed during calibration. Similarly, in the following block 64, the cylinder pressure $P_1$ for the known load at that cylinder extension X is computed. Next, the estimated payload weight W_est1 is calculated in the block 65 by using the following interpolate and extrapolate formula:

$$W\_est = (W_1 - W_0) * [(P - P_0)/(P_1 - P_0)]$$

where
$W_1$ is the known (full or rated) payload weight,
$W_0$ is the empty payload weight,
P is the current sampled pressure at cylinder extension X,
$P_1$ is pressure for the known load at cylinder extension X, and
$P_0$ is pressure for the empty load at cylinder extension X.

All the pressure values above are values for the measured extension X. Then an average W_avg is computed for all the estimated weights W_est in block 66.

If, in block 67, the average weight has remained virtually constant for a predetermined amount of time, lifting has probably ceased and there is no advantage to prolonging the sampling period. If, at block 61, it is detected that the LIFTING state flag is no longer true, then the END OF LIFT flag is checked in block 62. This flag is true if any of the conditions for state transition from LIFTING to COMPUTING is true in FIG. 4. If the end of lift conditions are not met in one of the blocks 67 or 61, the algorithm returns to block 60 to continue to read sensor inputs. Otherwise, the average lift velocity V_avg is computed in block 68 by dividing the distance the cylinder 14 has extended by the amount of time it took.

As previously discussed, the cylinder pressure versus extension curves (or the payload weight derived therefrom) have a linear relationship with respect to the lift velocity, i.e. the faster the lift, the higher the payload weight value; therefore, adjustments need to be made to compensate for the linear shift. In block 69, the computed payload weight is adjusted by a value according to the computed average velocity. The values m and b in the linear equation $$m * V\_avg + b$$

are derived experimentally. Thereafter, in block 70, the computed payload value is stored and displayed. The payload values may also be used in computing productivity summaries, and may be accumulated for specific transport vehicles and dump sites.

With reference to FIG. 7, a second estimate of the payload weight, W_est2, which negates the effect of the varying seal friction, is determined after a lift operation is completed. In block 71 the rotary sensor 20 and the pressure transducer 21 are read by the microprocessor 24 and stored in memory in block 72. In block 74, if the vehicle is still lifting the load, control returns to block 71 to obtain additional sensor readings.

After the lifting operation is complete (block 76), the sensor readings are curve fit to a second order polynomial (43) of the form:

$$A_2X^2 + B_2X + C_2.$$

In block 78, pressure differentials, $\Delta P_0, \Delta P_1, \Delta P_2$, corresponding to the first and second reference parabolic curves 38,40 and the parabolic curve 43 of the unknown load, respectively, are determined. The pressure differentials are calculated as a change in pressure over a change in lift cylinder extension. In the preferred embodiment, each pressure differential is determined over a predetermined lift cylinder extension range, for example, the ¼ to ⅛ latter portion of the lift operation.

Next, the estimated payload weight W_est2 is calculated in the block 80 by using the following interpolate and extrapolate formula:

$$W\_est2 = (W_1 - W_0) * [(\Delta P_2 - \Delta P_0)/(\Delta P_1 - \Delta P_0)].$$

Afterwards, in blocks 82 and 84, the estimate is adjusted based on the average velocity, as discussed above. In block 86 the payload is stored and displayed.

The two methods of estimating the payload, as described and shown in FIGS. 6 and 7 respectively, may be used singularly or in combination. Either method results in an accurate estimate of payload determination. The second method however accounts for shifts in the payload parabolic curve 43 due to changes in the hydraulic system. By combining the two methods, that is by computing both estimates, the shift in curve 43 can be seen as a difference between the two estimates. This difference can be used both to improve the accuracy of future payload determinations and calibrations and as an indicator of the state of the seals within the hydraulic cylinder.

Industrial Applicability

The operation of the present invention is best described in relation to its use in loading applications where knowledge of payload weight is important. This payload measurement system is also valuable in operations where it is desirable to monitor loader vehicle productivity.

Prior to its first use, the payload monitor 10 must be calibrated. Thereafter, calibration must be done periodically, for example, at the beginning of each shift. Calibration must also be repeated whenever there has been a change in the lift arm assembly configuration, such as switching to a different bucket 16 or substantial overhaul of any of the lift arm assembly subsystem. Calibration of the payload monitor 10 includes lifting the lift arm assembly 12 from ground level to dump level with an empty bucket 16, entering the payload weight, and repeating the procedure with material of a known weight in the bucket 16. Preferably, the known weight is near or at the rated capacity of the loader vehicle 11. The bucket 16 should be racked back during the lifting process to ensure that the center of gravity (C. G.) of the payload weight remains near the center of the bucket 16. The racked back bucket 16 constraint may be removed by including a position sensor in the tilt cylinder 15 to sense the degree of bucket tilt to compensate for the C. G. shift.

A typical work cycle of a loader 11 includes, sequentially: digging and/or crowding a stock pile, racking back the bucket 16 to maintain load, reversing and backing out of the pile while raising the bucket 16, traveling to a dump site or a transport vehicle while continuously raising the bucket 16, and finally dumping the load from a raised position. This loading cycle is not interrupted by the usage of the dynamic payload monitor 10, because stopping the vehicle 11 is not required and the bucket 16 is not required to be positioned at a specific height for a period of time. The operator simply resets the load cycle, enters the assigned dump vehicle or site number if such function is desired, and proceeds to load and dump following a normal work cycle. In addition, productivity summaries and hard copies of such and other payload information may be obtained from the system 10. The payload data may also be downloaded to a data disk for storage or for analysis in an office setting.

The present invention is also expandable to other vehicles with different linkage configurations by compensating for the difference thereof. Anticipated applicable vehicle types are excavators, front shovels, backhoe loaders, and any vehicles having at least one linkage with at least one hydraulic cylinder for modifying that linkage configuration. For these vehicle linkage configurations, additional pressure and position sensors may be needed to detect cylinder pressure and linkage geometry during the work cycle. However, the basic payload weight calculation remains the same, using curve fitting methods and two reference weight equations.

Other aspects, objects, and advantages of this invention can be obtained from a study of the drawings, the disclosure, and the appended claims.

I claim:

1. An apparatus for dynamically measuring payload weight supported by an implement linkage of a work vehicle, said implement linkage adapted to perform a work cycle including a lift portion, comprising:

a hydraulic cylinder connected between said vehicle and said implement linkage and being so constructed and adapted to actuate said implement linkage;

pressure sensing means for detecting hydraulic pressure within said hydraulic cylinder and responsively producing a first signal during said lift portion; and computing means for receiving said first signal, determining an actual pressure differential in response to a difference in pressure within said hydraulic cylinder over a predetermined range of a predetermined operating parameter, and determining said payload weight as a function of said actual pressure differential.

2. An apparatus, as set forth in claim 1, wherein said payload is determined by comparing said actual pressure differential with at least one reference pressure differential.

3. An apparatus, as set forth in claim 1, wherein said computing means includes means for producing first and second reference parabolic curves, producing an actual payload parabolic curve in response to receiving said first signal, and calculating first and second reference pressure differentials based on said first and second reference parabolic curves, respectively, and wherein said actual pressure differential is calculated as a function of said actual payload parabolic curve.

4. An apparatus, as set forth in claim 3, wherein said payload weight is determined by interpolation if said actual pressure differential is between said first and second reference pressure differentials and by extrapolation if said pressure differential is not between said first and second reference pressure differentials.

5. An apparatus, as set forth in claim 3, wherein said actual payload parabolic curve is produced through curve fitting.

6. An apparatus, as set forth in claim 1, wherein said predetermined range of an operating characteristic is a predetermined time period during the lifting portion of said vehicle's work cycle.

7. An apparatus, as set forth in claim 1, including position sensing means for detecting position of said implement linkage and responsively producing a position signal, and wherein said computing means includes means for receiving said position signal and said actual pressure differential is calculated as a function of said first signal and said position signal.

8. An apparatus, as set forth in claim 7, wherein said actual pressure differential is calculated over a predetermined implement linkage position range.

9. An apparatus, as set forth in claim 7, wherein said position sensing means includes a sensor adapted to measure the rotational angle of said implement linkage about a pivot pin.

10. An apparatus, as set forth in claim 7, wherein said position sensing means includes a sensor adapted to measure extension of said hydraulic cylinder.

* * * * *